June 9, 1942.　　　P. KOLLSMAN　　　2,285,521
VERTICAL SPEED INDICATOR
Filed March 30, 1939　　　4 Sheets-Sheet 2
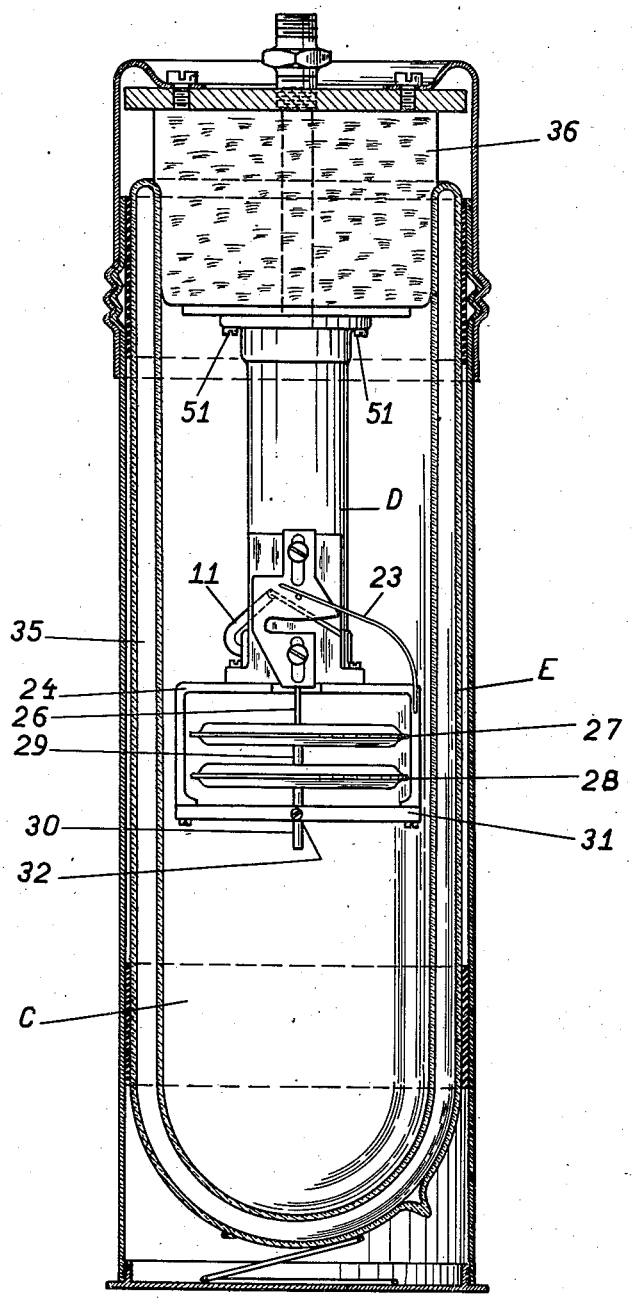
Fig_2
INVENTOR
PAUL KOLLSMAN
BY
ATTORNEY

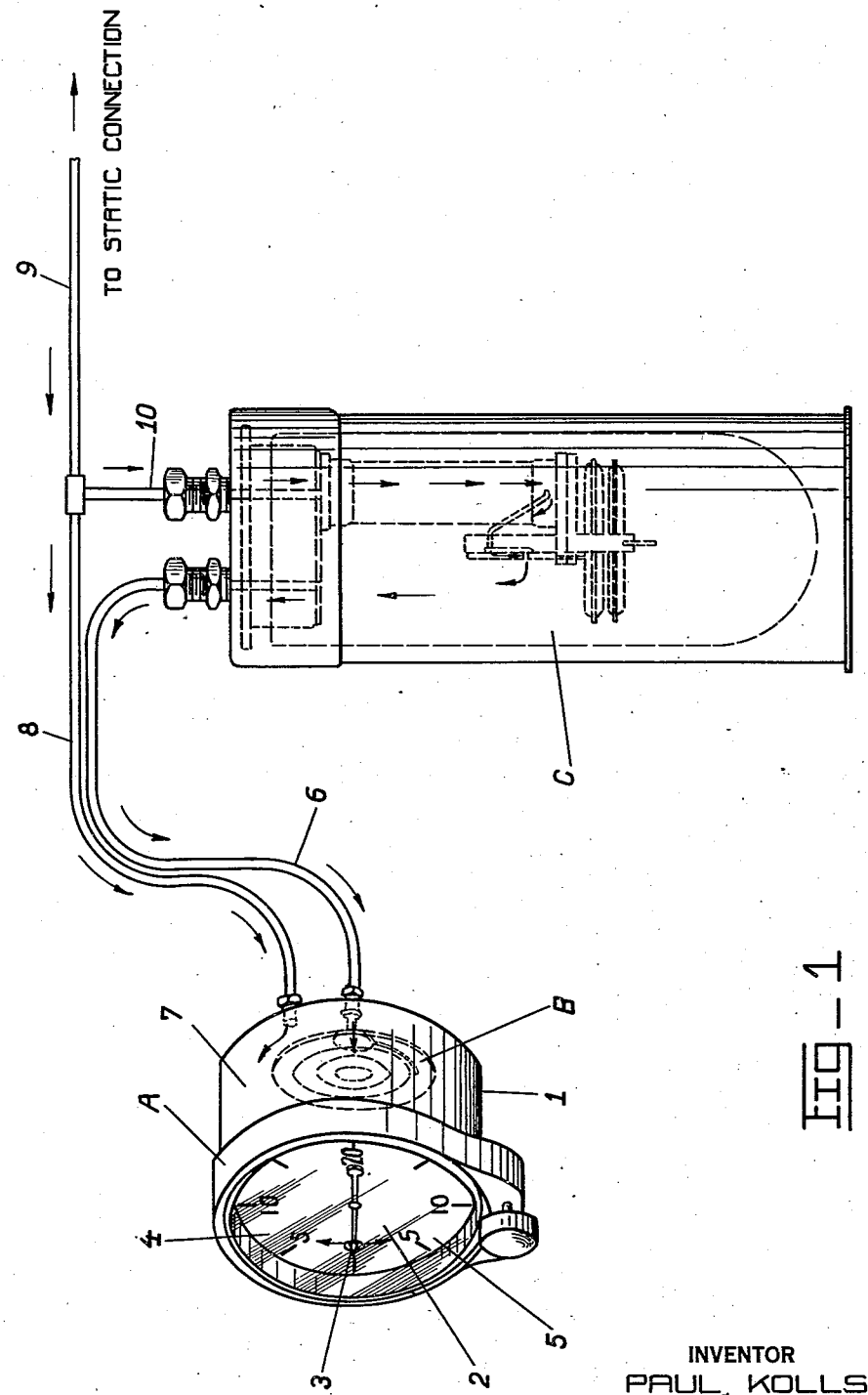

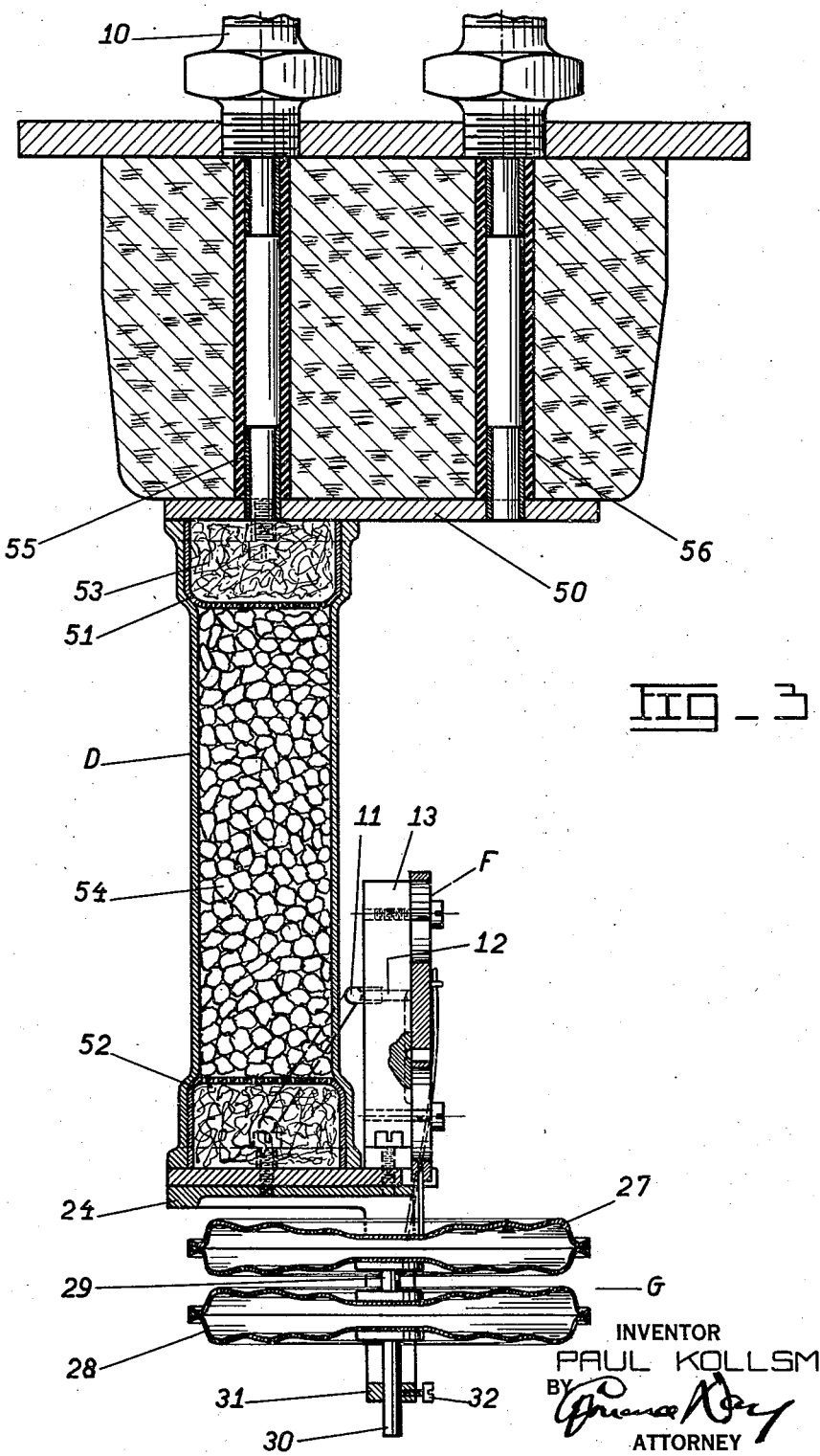

June 9, 1942.　　　P. KOLLSMAN　　　2,285,521
VERTICAL SPEED INDICATOR
Filed March 30, 1939　　　4 Sheets-Sheet 4
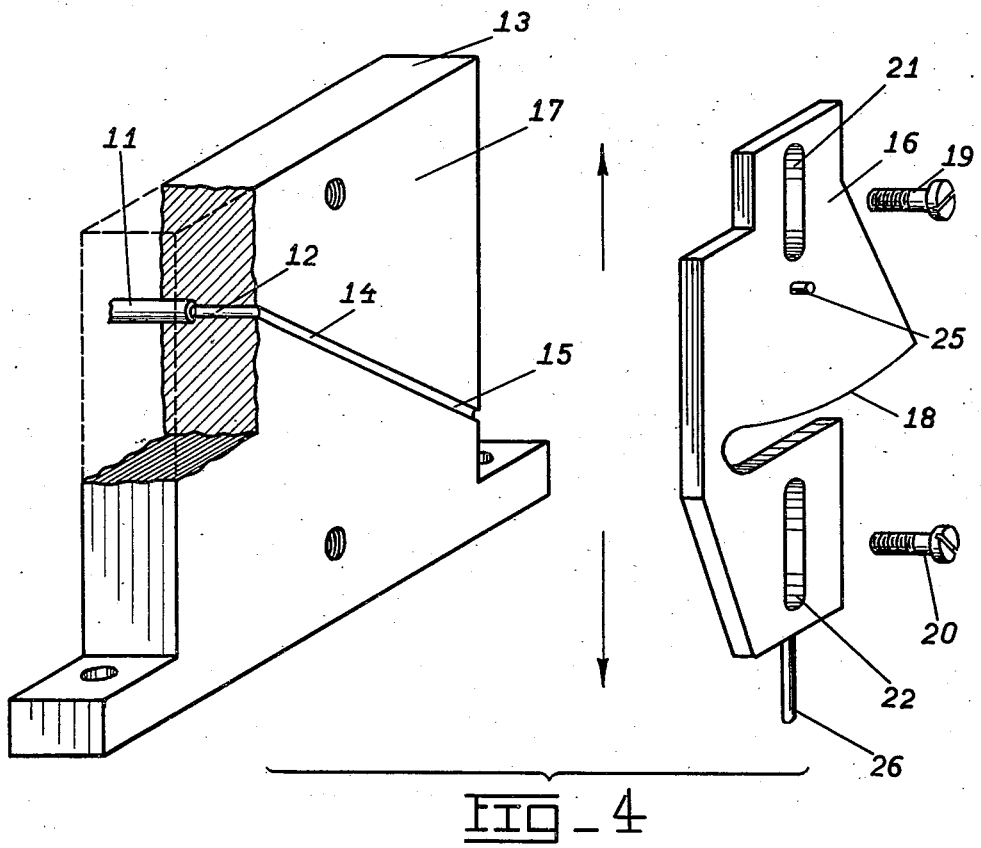
Fig_4
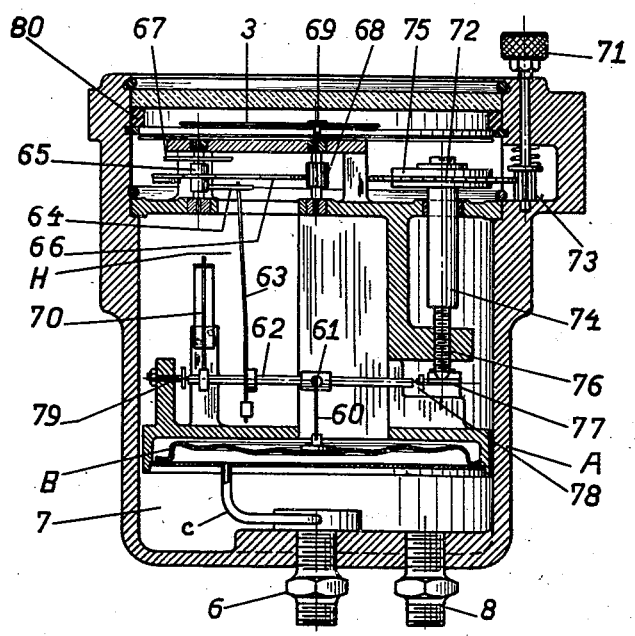
Fig_5
INVENTOR
PAUL KOLLSMAN
BY
ATTORNEY Patented June 9, 1942

2,285,521

UNITED STATES PATENT OFFICE 2,285,521

VERTICAL SPEED INDICATOR

Paul Kollsman, New York, N. Y., assignor, by mesne assignments, to Square D Company, Detroit, Mich., a corporation of Michigan Continuation of application Serial No. 28,954, June 28, 1935. This application March 30, 1939, Serial No. 265,064

20 Claims. (Cl. 73—179)

This application is a continuation of my copending application Serial No. 28,954, filed June 28, 1935, entitled "Vertical speed indicator," allowed March 8, 1939, which application is about to be abandoned.

My invention relates to vertical speed indicators for air craft and operates in response to the rate of change of pressure of the atmosphere at the locality of the air craft as the instrument is carried by the air craft either up or down. It is an object of my invention to improve upon the vertical speed indicator in which a restricted fluid connection in the form of a manually adjustable capillary tube serves as a restricted fluid passage for air into and out of the interior of an aneroid capsule from and to the atmosphere as described in connection with the vertical speed indicator of Prof. Dr. v. dem Borne. (Deutsche Luftfahrerzeitschrift, 1912, No. 22, XVI, pg. 538.)

In carrying out my invention I purpose the protection of the restricted fluid connection by surrounding it with heat insulating walls. Further, I purpose the automatic variation of the retarding effect upon fluid flow of my restricted fluid connection to accord with the variations of a variable such as atmospheric pressure and/or temperature.

It is a well known fact that a capillary offers too little resistance to air of decreased temperature due to the corresponding decrease in the viscosity of the air. This change in the resistance causes an error in the indication, for example, the instrument will read low upon a decrease in temperature of the air.

A similar error occurs if the absolute pressure of the air changes. A decrease in the absolute pressure of the air causes an error of the same sign as an increase in temperature, and vice versa. For example a decrease in the absolute pressure causes a reading of the indicator which is too high.

According to this invention I propose to compensate for these errors by automatically varying the retarding effect of the restricted fluid connection upon a flow of air therethrough in response to changes in both temperature and pressure so that the restricting effect shall be constant under conditions of changing temperature and pressure.

I further purpose to employ instead of a capillary tube for the preferred embodiment of my restricted fluid connection a tiny groove of minute cross section for its channel in a block having a movable cover plate closing over the groove to complete an attenuated channel or connection closed in its cross section in the locality of and by the cover plate. I further purpose moving this cover plate to vary the effective length of the restricted fluid connection thus formed by the cover plate and the groove. In carrying out the more particular objects of my invention I contemplate shaping the terminal edge of the cover plate and the groove relatively to each other and causing relative movement in such a way as to vary the restricting effect of this variable restricted fluid connection to accord with any desired formula or dictum when the cover plate is moved or actuated by a varying force derived from some variable requiring or needing compensation. Examples of such a variable are temperature and pressure.

Although it is true that it is the viscosity of the fluid flowing through a restricted fluid connection which determines the rate of flow for the fluid; although it is true that temperature change is the principal cause for the change in the viscosity of a gas including air, it should be borne in mind that it is the temperature of the air actually passing through the restricted fluid connection which controls. It should also be borne in mind that changes in altitude in feet are not in direct proportion to changes in barometric pressure as interpreted by an aneroid capsule.

One of the objectives of this invention is to insure adequate and correct compensation for changes in the temperature affected viscosity of the air actually passing through the restricted fluid connection. To this end the slight amount of atmospheric air entering the apparatus to pass through this restricted fluid connection is first caused to pass through parts having great heat capacity relatively to the amount of heat in the volume of air introduced. These parts of great heat capacity are also protected against direct heat transfer to or from the atmosphere and are limited in their functioning to the minute amount of air entering in response to a descent of the aeroplane.

The above and further objects of my invention will be pointed out more particularly in the following claims. The claims are directed to an illustrative embodiment of the invention for purposes of illustration and not limitation. Such illustrative embodiment of the invention is described in the following specification in connection with the accompanying drawings which form part hereof.

In the drawings:

Fig. 1 is a diagrammatic view indicating the various parts in combination;

Fig. 2 is a vertical section drawn to an enlarged scale of a heat insulating container for parts of the mechanism and the parts of the mechanism contained therein;

Fig. 3 is a still further enlarged vertical section with parts in elevation of the interior mechanism of Fig. 2 but taken in a plane at right angles to that of Fig. 2;

Fig. 4 is a separate perspective view of my groove type restricted fluid connection;

Fig. 5 is an enlarged axial section of the indicating mechanism.

Referring now more in detail to the drawings in which like characters designate corresponding parts in the several figures:

One complete vertical speed indicator assemblage is shown in Fig. 1 although it is to be understood that many of the features of the invention are by no means limited to the relative positioning and construction shown in this assemblage. The indicating part A is shown in the form of case 1 mounting the scale bearing dial 2 upon which the pointer 3 indicates the vertical speed preferably in hundreds of feet per minute (HFM). In the embodiment illustrated the upper portion of the dial bears the rate-of-climb scale 4 and the lower portion of the dial bears the rate-of-descent scale 5. The pointer 3 is suitably operated from an expansible diaphragm device B shown in the form of an aneroid capsule. Structural details of this part A will better be understood from Fig. 5 later to be described.

The vertical air speed in accordance with the invention is indicated to the pilot by a movable indicator 3 actually operated through suitable linkage by a movable diaphragm B, shown in Fig. 5, connected to the link 60. This diaphragm and indicator are operated by a differential pressure on opposite sides of this diaphragm. On one side it has the free varying atmospheric pressure and on the other side a pressure different from atmospheric pressure but approaching toward it under control of air passing through a constricted passage which passage retards the flow of air by viscosity. This flowing air must be of substantial volume for practical functioning and a chamber such as C provides for this substantial volume. If the air so flowing gets colder it is less viscous and the movement of the diaphragm and indicator 3 would be too little for a correct speed indication unless the movement of the indicator were increased by some compensation. By my invention I not only do this but my compensation is in accordance with temperature conditions equal to those which actually affect the viscosity of this substantial volume of air. For hotter air the tendency of the indicator to move too much occurs and I also compensate this by making it move less in accordance with the same temperature conditions which were employed for the opposite condition requiring compensation. I consider it of importance that I control the compensation from the temperature changes of the actual air the viscosity of which is affected by such temperature changes and not by other remote temperature changes.

The interior of the aneroid capsule B is connected with an auxiliary chamber C through a duct 6. The inner cavity 7 of part A is connected to the atmosphere through ducts 8 and 9, duct 9 preferably leading to the static pressure part of a Pitot tube device. Ducts 8 and 9 join duct 10 which leads into auxiliary chamber C but not into direct connection therewith. Duct 10 first leads into the interior of the moisture eliminator D hermetically closed from the rest of the chamber C except through the duct 11 which is sealed into the perforation 12 of block 13. Perforation 12 terminates in the trough of the minute groove 14 formed in the face of block 13. It should be understood that, although the end 15 of groove 14 may be open, the opposite end of groove 14 is closed off so that the cover plate 16 when held in place against face 17 of block 13 constitutes or completes for the groove 14 an attenuated fluid connection for the duct 11 with chamber C. The cover plate 16 preferably has a functioning terminal edge 18 curved relatively to the groove 14 to conform to any desired formula or dictum suitable for the proper variation of this passage automatically in response to a selected variable, such as pressure. Cover plate 16 may be guided across the face 17 of block 13 in any suitable way as by small screws 19 and 20 passing through slots 21 and 22. It is preferred that a spring 23 mounted on the frame 24 normally press the cover plate 16 against the face 17 and tend to press the cover plate 16 downwards, as shown in Figs. 2, 3 and 4. In this functioning spring 23 may engage pin 25. Rod 26 made fast to cover plate 16 extends downwardly through frame 24 into operative engagement with the compensating tandem aneroid capsules 27 and 28. Capsule 27 is connected to capsule 28 by the axially positioned stub shaft 29. The lower capsule bears the axial pin 30 which may be secured adjustably to the cross bar 31, as by set screw 32.

The groove 14, covered and controlled by means of the cover plate 16 operated by the tandem capsules 27 and 28, constitutes fluid passage means for retarding the rate at which the pressure on the inside of the yielding diaphragm of aneroid capsule B tends to become equal to a changing atmospheric pressure which is substantially freely applied to duct 11 located within chamber C, duct 11 connecting with said fluid passage means. Chamber C, freely connected through duct 6 with aneroid device B which has a yielding wall subject to atmospheric pressure on one side, increases the sensitivity of the apparatus by reason of the fact that the large volume of air in chamber C may be many times that within the aneroid capsule B and connecting duct 6. Although aneroid capsule B and duct 6 may be subjected to great variations of temperature the consequent variation in the air volume of chamber B plus duct 6 plus chamber C is negligible. Chamber C is nearly perfectly heat insulated preferably by forming it within vacuum insulating walls 35. In fact, the wall structure E is designated in the art as a thermos bottle. The hermetically sealing stopper 36 of this bottle E may mount all the parts previously described including the moisture remover D, the variable restricted fluid connection F and the actuator G. Thus within all reasonable time limits there is no variation of the temperature either of the air or of the parts within chamber C. In this way the restricting fluid connection F is rendered substantially free from any disturbing variation on account of temperature changes in the atmosphere. In the embodiment illustrated the actuator G, shown in the form of gas filled aneroid capsules, functions automatically to vary the restricting effect of the fluid connection F by moving the cover plate so that its edge 18 varies the retarding effect of the consequent fluid connection F and so that it shall be constant against any change in fluid viscosity due to a change in pressure and in temperature of the air in the chamber. The compensation for decreased pressure is of the same sign as that for an increase in temperature, so that the compensation by F and G is the combination effect of temperature and pressure changes. It, however, is to be understood that a perfect embodiment of the invention includes means within the chamber C to produce the automatic compensating function through the variable-atmospheric pressure which varies with the altitude within chamber C.

The moisture remover or trap D is secured to the stopper plate 50 in any suitable manner as by the screws 51. It is preferable that this trap D be symmetrical about a central axis and about a central cross plane. It is shown having perforated thimbles 51 and 52, one at each end packed with steel wool 53. The center cylindrical portion of the trap D may be filled with water avid chemical, such as calcium chloride or even sodium chloride. In fact these salts are illustrative of any salt which is avid for moisture and which will absorb considerable moisture without melting and without liberating gases, as is the case with calcium carbide. By the provision of this moisture trap D, atmospheric air cannot enter chamber C and cannot pass in through the fluid connection F without first being dehydrated. The stopper plate 50 may be secured conveniently by extensions of the ducts 6 and 10 which are shown sealed by rubber tubes 55 and 56.

The lower end of the trap D mounts the frame 24 to which likewise may be secured the block 13.

The indicator part A may contain any suitable and well known gear and link mechanism H for operating the pointer 3 from the yielding diaphragm B. As shown in detail in Fig. 5, a link 60 links diaphragm B with lever 61 on rock shaft 62. Multiplying lever 63 fast to rock shaft 62 extends up to pin 64 on sector stub shaft 65 to move the toothed sector 66 cooperatively with the retrieving hair spring 67. Sector 66 meshes with pinion 68 fast to the pointer shaft 69.

70 is a temperature compensator. Thumb screw 71 operates gear 72 by means of pinion 73, gear 72 being gripped to shaft 74 frictionally by friction clutch 75. The lower end of shaft 74 has the threaded portion 76 bearing against spring 77 which carries one bearing 78 located opposite the fixed bearing 79 for rock shaft 62. A movement of bearing 78 up or down adjusts the pointer 3.

Duct 6, mounted in the casing A, connects with the interior of aneroid B by small duct c, while duct 8 communicates directly with chamber 7 which is preferably hermetically sealed against the atmosphere as by a packing ring 80.

Obviously, the present invention is not restricted to the particular embodiments herein shown and described, but may be modified without departing from the spirit of the present invention.

What is claimed is:

1. A vertical speed indicator comprising a bottle with heat insulating walls containing a substantial charge of air; means including a flow restricting member for establishing restricted communication between the inside of the said bottle and the atmosphere; indicating elements; indicating mechanism connected to said indicating elements and operating in response to an inequality of air pressures inside said bottle and the atmosphere, respectively, which pressures tend to become equalized to atmospheric pressure by viscously retarded air flow through said means, characterized by the employment of compensating means heat insulated in effect substantially equal to that effected by the heat insulation of said bottle and responsive to changes in changing condition of the air in said bottle for automatically increasing and decreasing the indication of said indicating elements in response to a decrease and increase of air viscosity caused by changes in the condition of the air, such condition being at least one of the group comprising temperature and pressure.

2. In combination in a vertical speed indicator, an indication operating device having a movable wall completing a small cavity; a relatively large heat insulated chamber operatively connected with said cavity whereby a substantial air volume is separated from the atmosphere; a restricting air connection between said substantial air volume and the atmosphere; indicating means actuated by said movable wall; and air viscosity change compensating means for automatically increasing and decreasing the indication of said indicating means in response to a decrease and increase in viscosity, respectively, said compensating means being located in heat insulated relation to the atmosphere in a manner substantially equal to that of the heat insulation of the interior of said heat insulated chamber.

3. A vertical speed indicating mechanism operating in response to the inequality of air pressures on opposite sides of a movable wall which pressures tend to become equalized to atmospheric pressure by viscously retarded air flow, which air flow is produced by such inequality of air pressures, comprising a vacuum walled heat-insulating bottle having a metallic aneroid capsule, a restricted passage controlled thereby, and a substantial charge of air, all within said bottle and effectively heat-insulated by its vacuum walls for substantial periods of time from the effect of external temperature changes.

4. A vertical speed indicating mechanism according to claim 3 with the vacuum heat-insulating walls in the form of any heat-insulating material walls.

5. In combination in a vertical speed indicator a variably resisting fluid flow connection device; a vacuum walled bottle enclosing and heat insulating said connection device in its entirety; and means responsive to a variable inside said bottle for automatically varying the resisting effect upon a fluid flow in said connection device, such variables being pressure as well as temperature.

6. In a vertical air speed indicator, a fluid tight chamber having heat insulating walls and containing a substantial charge of air, a restricted passage means between said chamber and the surrounding atmosphere, an element responsive to differences in air pressure between said chamber and the atmosphere, an indicating mechanism comprising a scale and index for indicating the said difference in pressure, said mechanism being operated by said element and heat insulated compensating means for adjusting the size of said restricted passage according to the temperature and pressure of the air in said chamber.

7. In a vertical speed indicator, a plurality of aneroid members, a heat insulated chamber, and a restricted passage means between said chamber and the atmosphere, one of said aneroids being connected to be acted upon by the pressure in said chamber, the other of said aneroids being heat insulated, temperature responsive, and associated with said restricted passage for varying the amount of restriction therein.

8. In a vertical air speed responsive instrument, the combination of a chamber enclosing a substantial volume of air; a constricted passage connecting said chamber with the atmosphere; a differential pressure responsive member connected to respond to a difference in pressure inside said chamber and the atmosphere, respectively; a movable member connected to be actuated by said pressure responsive member; and a temperature responsive element subjected to equal conditions in change in temperature as are affecting said volume of air, said element being arranged to cause an increased or decreased movement of said movable member upon a decrease or increase in temperature, respectively, whereby said member will be moved in true response to a vertical air speed irrespective of changes in viscosity of the air.

9. In a vertical air speed indicator, the combination of a chamber enclosing a substantial volume of air; a constricted passage connecting said chamber with the atmosphere; a differential pressure responsive member connected to respond to a difference in pressure inside said chamber and the atmosphere, respectively; a movable indicator connected to be actuated by said pressure responsive member; and a temperature responsive element acted upon by changes in temperature substantially equal to those affecting said volume of air, said element being arranged to cause an increased or decreased movement of said indicator upon a decrease or increase in temperature, respectively, whereby said indicator will be moved in true response to a vertical air speed irrespective of changes in viscosity of the air.

10. In a vertical air speed responsive instrument, the combination of a chamber enclosing a substantial volume of air; a constricted passage connecting said chamber with the atmosphere; a differential pressure responsive member connected to respond to a difference in pressure inside said chamber and the atmosphere, respectively; a movable member connected to be actuated by said pressure responsive member; and a temperature responsive element acted upon by changes in temperature substantially equal to the changes affecting said volume of air and connected to vary in response to changes in temperature the resistance of said passage to a flow of air therethrough, whereby said member will be moved in true response to a vertical air speed irrespective of changes in viscosity of the air.

11. In a vertical air speed indicator, the combination of a chamber enclosing a substantial volume of air; a constricted passage connecting said chamber with the atmosphere; a differential pressure responsive member connected to respond to a difference in pressure inside said chamber and the atmosphere, respectively; a movable indicator connected to be actuated by said pressure responsive member; and a temperature responsive element responsive to the temperature inside said chamber and connected to vary in response to changes in temperature the resistance of said passage to a flow of air therethrough, whereby said indicator will be moved in true response to a vertical air speed irrespective of changes in viscosity of the air.

12. In a vertical air speed indicator, the combination of a temperature insulated chamber enclosing a substantial volume of air; a constricted passage connecting said chamber with the atmosphere; a differential pressure responsive member connected to respond to a difference in pressure inside said chamber and the atmosphere, respectively; a movable indicator connected to be actuated by said pressure responsive member; and a temperature responsive element inside said chamber and connected to vary the resistance of said passage to a flow of air therethrough, whereby said indicator will be moved in true response to a vertical air speed irrespective of changes in viscosity of the air.

13. In a vertical air speed responsive instrument, the combination of a chamber enclosing a substantial volume of air; a constricted passage connecting said chamber with the atmosphere; a differential pressure responsive member connected to respond to a difference in pressure inside said chamber and the atmosphere, respectively; a movable member connected to be actuated by said pressure responsive member; and an element responsive both to variations in pressure and temperature of the air inside said chamber and connected to increase and decrease the resistance of said passage to a flow of air therethrough upon a rise in pressure and drop in temperature, and a drop in pressure and rise in temperature, respectively, whereby said member will be moved in true response to a vertical air speed, irrespective of changes in altitude and viscosity of the air.

14. In a vertical air speed responsive instrument, the combination of a chamber enclosing a substantial volume of air; a constricted passage connecting said chamber with the atmosphere; a differential pressure responsive member connected to respond to a difference in pressure inside said chamber and the atmosphere, respectively; a movable member connected to be actuated by said pressure responsive member; and an expansible hollow diaphragm member filled with a charge of gas positioned inside said chamber and connected to increase and decrease the resistance of said passage to a flow of air therethrough upon a rise in pressure and drop in temperature, and a drop in pressure and rise in temperature, respectively, whereby said member will be moved in true response to a vertical air speed, irrespective of changes in altitude and viscosity of the air.

15. In a vertical air speed indicator, the combination with a chamber enclosing a substantial volume of air and a differential pressure responsive member connected to respond to a difference in pressure inside said chamber and the atmosphere, respectively; of means forming a passage between said chamber and the atmosphere, said means including a block having a passage and a surface groove extending from said passage; and a cover member abutting said block at portions adjoining said groove and adjustable relatively thereto for completing a variable portion of said groove into a capillary passage.

16. In a vertical air speed indicator, the combination of a temperature insulated chamber enclosing a substantial volume of air; a constricted passage positioned to assume the temperature of the air inside said chamber connecting said chamber with the atmosphere; a differential pressure responsive member connected to respond to a difference in pressure inside said chamber and the atmosphere, respectively; a movable indicator connected to be actuated by said pressure responsive member; and a temperature responsive element inside said chamber and connected to vary the resistance of said passage to a flow of air therethrough, whereby said indicator will be moved in true response to a vertical air speed irrespective of changes in viscosity of the air.

17. In a vertical air speed indicator, the combination with indicating means; a chamber having temperature insulating walls completely enclosing a substantial volume of air; a pressure responsive member connected to respond to a difference in pressure inside said chamber and the surrounding atmosphere, said pressure responsive member being connected to move said indicating means in dependence on such differences in pressure; and a constricted passage connecting said chamber with the surrounding atmosphere; of an expansible diaphragm member inside said chamber, said diaphragm member being effective automatically in response to a variable, such variable being one of the group consisting of pressure and temperature to increase and decrease the movements of said indicating means.

18. In a device of the character described the combination of a chamber enclosing a substantial volume of air; a constricted passage connecting said chamber with the surrounding atmosphere; a differential pressure responsive member connected to respond to a difference in pressure inside said chamber and the atmosphere, respectively; and means responsive to a variable inside said chamber and operatively connected to said constricted passage to vary, in response to such variable, the resistance of said passage, to a flow therethrough, such variables being pressure as well as temperature.

19. In a device of the character described, the combination with a chamber enclosing a volume of air, and a differential pressure responsive member connected to respond to a difference in pressure between said chamber and the atmospheric air; of flow resistance means between said chamber and the atmosphere providing a restricted path for a flow of air to and from said chamber as the pressure therein decreases or increases relatively to the pressure of the atmosphere, said flow resistance means including a member acted upon by the air in said chamber and automatically movable in dependence on changes in at least one of the group of variables comprising pressure and temperature of the air in said chamber, said member being arranged to vary the total flow resistance of said resistance means by increasing and decreasing, in dependence on such changes, the total length of the restricted path through which air flows to maintain the resistance to flow of air into and from said chamber substantially constant under such changes in temperature and pressure of air in said chamber.

20. In a device of the character described, the combination with a chamber enclosing a volume of air, and a differential pressure responsive member connected to respond to a difference in pressure between said chamber and the atmospheric air; of flow resistance means between said chamber and the atmosphere providing a restricted path for a flow of air to and from said chamber as the pressure therein decreases or increases relatively to the pressure of the atmosphere, said flow resistance means including a member automatically movable in dependence on changes in both pressure and temperature of the air acting on said member, said member being arranged to vary the total flow resistance by increasing and decreasing, in dependence with such changes, the total length of the restricted path through which air flows to maintain the resistance to flow of air into and from said chamber substantially constant under changes in both temperature and pressure of the air acting on said member.

PAUL KOLLSMAN.